Sept. 7, 1948.  E. S. GUTTMANN  2,448,974
MICROSCOPE MOUNTING WITH SELF-CONTAINED ILLUMINATOR
Filed Aug. 23, 1945
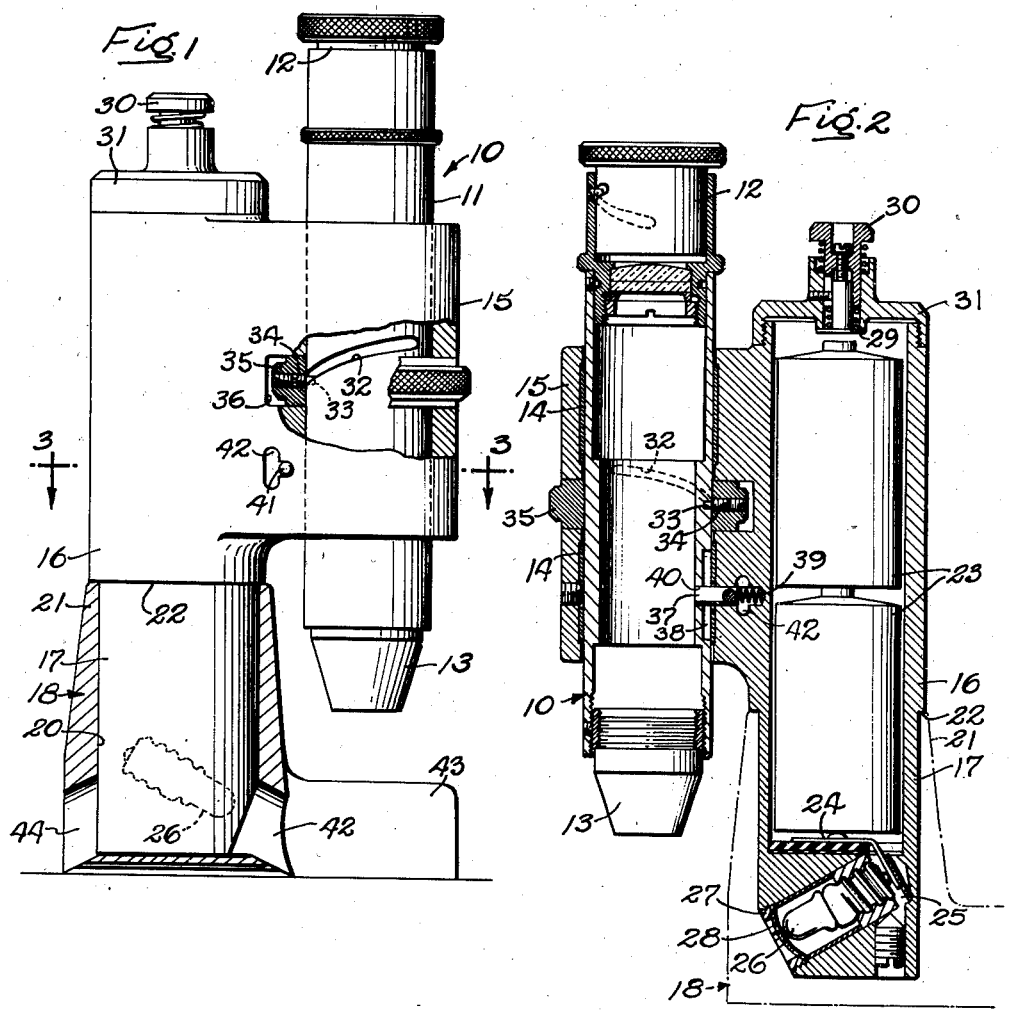
INVENTOR
Eric S. Guttmann
ATTORNEYS Patented Sept. 7, 1948

2,448,974

UNITED STATES PATENT OFFICE 2,448,974

MICROSCOPE MOUNTING WITH SELF-CONTAINED ILLUMINATOR

Eric S. Guttmann, Burbank, Calif., assignor to Albert S. Polan, E. G. Polan, L. M. Polan, Charles M. Polan, and Lake Polan, Jr., a copartnership doing business as Zenith Optical Company, Huntington, W. Va.

Application August 23, 1945, Serial No. 612,228

3 Claims. (Cl. 88—39)

This invention relates to microscopes of the type particularly adapted for shop use, and the general object is to provide a microscope which is simple in construction, and substantially more versatile than prior shop microscopes in its adaptability to different industrial uses.

Another object is to provide a novel means for removably mounting the microscope in a supporting base.

A further object is to provide a novel connection between the microscope and its mounting so as to facilitate axial focusing adjustment of the microscope.

Other objects and advantages of the invention will become apparent from the following detailed description taken in connection with the accompanying drawings, in which Figure 1 is a side elevation of the improved microscope with its supporting base shown in vertical section.

Fig. 2 is a vertical diametrical sectional view.

Fig. 3 is a section taken along the line 3—3 of Fig. 1.

The present invention provides a novel mounting for a microscope 10 of conventional construction comprising a sleeve 11 having an eye piece 12 adjustably mounted in one end and an objective 13 in the other end. Herein the sleeve is slidable in a vertical bore formed by spaced bushings 14 within the upper and lower portions of an arm 15 cast integral with and projecting laterally from a post 16. The lower end 17 of the latter projects beyond the lower end of the microscope and is mounted in a base 18 for ready removal therefrom and also for angular adjustment about the vertical axis of the post. To this end, the post end 17 is formed with a machined external cylindrical surface so as to fit loosely in the open upper end of a bore 20 formed in a projection 21 upstanding from one end of the base. A shoulder 22 on the post engages the upper end of the projection to determine the height of the microscope relative to the flat bottom of the base which is adapted to rest on or be clamped against a supporting surface. The end of the base opposite the projection 21 is forked to form arms 43 spaced apart to permit viewing of the area of the supporting surface in line with the microscope axis when the post is angularly positioned relative to the base, as shown in Figs. 1 and 3.

By turning the post in the base, the microscope may be swung laterally to bring any other portion of the work surface around the base into view. Or, the post may be removed from the base and mounted from its end 17 on any other kind of support.

The post 16 is made hollow and adapted to form a housing for a pair of standard batteries 23 resting on an insulated terminal 24 which projects downwardly into a recess 25 inclined downwardly and intersecting the side and end of the post bottom 17. This recess houses an electric lamp 26 which bears against the terminal 24 and is held in place by a ring 27 screwed into the end of the recess against a transparent cap 28. The grounded terminal of the lamp is connected to the terminal of the upper battery by a contact 29 spring urged upwardly and adapted to be forced against the battery terminal by depression of a button 30 which slides in a cap 31 screwed onto the upper end of the post.

With the post removably mounted in the base and the lamp 26 self-contained therein, the microscope may be used in many different ways. For viewing a surface on which the base is supported, the post will be positioned with the microscope in line with the recess between the forks of the base. In this position, the recess 25 and the lamp 26 in the post will register with a window 42 which is inclined downwardly and opens into the spaces between the base arms 43. When the post is turned through a half revolution to view an area of the work surface outside of the base, the lamp recess is brought into registry with a second window 44 in the base so that this work area is also illuminated. Or, when the post is removed from the base and supported in some other way, the work area within the view of the microscope is always lighted.

Provision is made for adjusting the microscope vertically relative to the post for focusing purposes. To this end, a helically extending groove 32 formed in the periphery of the sleeve 11 coacts with a projection 33 on the end of a screw 34 threading into a ring 35 which is rotatable on the sleeve 11. This ring has flat ends and is disposed in a slot 36 cut through the post arm 15 intermediate the ends of the latter. To hold the microscope barrel 11 against turning while permitting axial adjustment thereof, a detent pin 37 slidable radially in the post arm 15 is adapted to project into a longitudinal slot 38 in the periphery of the barrel 11. The detent is urged inwardly by a spring 39 and in one vertical position of the microscope (shown in Fig. 2) may drop into a hole 40 in the bottom of the slot thereby locking the microscope in a predetermined vertical position. In this position, the microscope is focused correctly for viewing a surface in the plane of the bottom of the base 18.

When viewing another surface necessitating a change in focus, the detent 37 may be retracted from the hole 40 by means of a crossbar 41 whose ends project laterally from the post arm 15. Then, the microscope may be adjusted up or down by turning the ring 35, the pin 37 sliding along the slot 38 thus holding the microscope against turning. By tilting the cross pin about the axis of the pin 37 after retraction, the cross pin will move into one end of a slot 42 and become latched in retracted position.

I claim as my invention:

1. A microscope comprising a base providing an upstanding tubular projection open at its upper end and having laterally opening windows adjacent the bottom of the base, a hollow post shaped at its lower end to fit into said projection and be supported thereby in upright position while free to turn about its longitudinal axis, an electric lamp in the bottom of said post adapted to direct light laterally through one of said windows when alined with one of the latter, said post being adapted to receive batteries adapted for connection with said lamp, an arm projecting laterally from the upper end portion of said post and having a bore extending vertically therethrough parallel to the post axis, and a microscope having its sleeve projecting slidably through said bore and supported by said arm.

2. A microscope comprising a base providing an upstanding tubular projection open at its upper end and having a window opening laterally adjacent the bottom of the base, a post shaped at its lower end to fit removably into said base so as to be supported thereby in upright position while being adjustable about its longitudinal axis, the lower end portion of said post having a recess opening laterally and adapted to aline with said window in one angular position of adjustment of the post, an electric lamp disposed in said recess and adapted to direct light outwardly through said window, an arm rigid with and projecting laterally from said post and having a vertical hole, and a microscope received in said hole and supported by said arm.

3. A mounting for a microscope comprising a post having an external cylindrical surface at its lower end, a base having an upwardly opening bore for receiving said lower post end to permit turning thereof relative to the base about the longitudinal axis of the post, an arm rigid with and projecting laterally from the post above said base and having a bore paralleling said axis and adapted to receive and support said microscope, and a lamp mounted within the lower end of said post for directing light laterally therefrom, said base having a window therein for directing said light onto a work surface within the view of the microscope when mounted in said base.

ERIC S. GUTTMANN.

REFERENCES CITED

The following references are of record in the file of this patent:

UNITED STATES PATENTS

| Number | Name | Date |
| --- | --- | --- |
| 2,005,068 | Batsel | June 18, 1935 |
| 2,146,506 | Maisch | Feb. 7, 1939 |

FOREIGN PATENTS

| Number | Country | Date |
| --- | --- | --- |
| 7,604 | Germany | Oct. 13, 1879 |
| 69,790 | France | Dec. 20, 1865 |

OTHER REFERENCES

Inspection Microscopes for Shop and Factory, publication of Bausch and Lomb Optical Company, published in 1930 and dated with Patent Office stamp September 28, 1937, pages 2 thru 6. 88–39 (C).